United States Patent [19]
Ridenour

[11] Patent Number: 5,573,285
[45] Date of Patent: Nov. 12, 1996

[54] HIGH-TEMPERATURE, DOUBLE-BEAD, TUBE-FITTING ASSEMBLY

[75] Inventor: Ralph G. Ridenour, Mansfield, Ohio

[73] Assignee: Universal Enterprises, Inc., Mansfield, Ohio

[21] Appl. No.: 371,357

[22] Filed: Jan. 11, 1995

[51] Int. Cl.[6] .................................................. F16L 19/02
[52] U.S. Cl. .................... 285/353; 285/351; 285/382.7; 285/187
[58] Field of Search .................... 29/516, 523; 285/354, 285/351, 382.2, 382.7, 340, 187, 382.5

[56] References Cited

U.S. PATENT DOCUMENTS

| | | | |
|---|---|---|---|
| 1,733,925 | 10/1929 | Weatherhead, Jr. . | |
| 1,802,538 | 8/1931 | Rych . | |
| 2,306,702 | 12/1942 | Koerner | 285/226 |
| 2,477,676 | 8/1949 | Woodling . | |
| 2,545,930 | 3/1951 | Richardson . | |
| 2,634,786 | 4/1953 | Stinchcomb et al. . | |
| 2,648,123 | 8/1953 | Phillips . | |
| 2,685,461 | 8/1954 | Mueller | 285/354 |
| 3,092,404 | 6/1963 | MacWilliam | 285/354 |
| 3,195,936 | 7/1965 | Conder . | |
| 3,393,930 | 7/1968 | Ziherl et al. | 285/354 |
| 3,537,733 | 11/1970 | Martin | 285/340 |
| 3,765,708 | 10/1973 | Pease et al. . | |
| 3,942,825 | 3/1976 | Balon . | |
| 4,006,524 | 2/1977 | Frank . | |
| 4,240,774 | 12/1980 | Ladusaw . | |
| 4,321,743 | 3/1982 | Ridenour | 29/516 |
| 4,442,586 | 4/1984 | Ridenour . | |
| 4,450,618 | 5/1984 | Ridenour . | |
| 4,538,842 | 9/1985 | Kowal et al. | 285/354 |
| 4,871,199 | 10/1989 | Ridenour et al. . | |
| 4,875,709 | 10/1989 | Carroll et al. | 285/14 |
| 4,889,368 | 12/1989 | Laipply | 285/354 |
| 5,092,634 | 3/1992 | Miller | 29/523 |
| 5,160,176 | 11/1992 | Gale | 285/340 |

*Primary Examiner*—Eric K. Nicholson
*Attorney, Agent, or Firm*—Pearne, Gordon, McCoy & Granger

[57] ABSTRACT

A tube-fitting assembly includes a formed tube, first and second threaded fitting members, and a sealing member. The tube has a first annular bead near an end of the tube and a second annular bead outboard of the first annular bead. The first threaded fitting member surrounds the tube and has a radially inwardly extending first shoulder inboard of the first and second annular beads. The second threaded fitting member has an annular second shoulder at an acute angle to a longitudinal axis of the tube. The second fitting member surrounds the end of the tube and is in threaded engagement with the second threaded member such that the second shoulder engages an outboard side of the second bead to establish a first seal between the tube and the second fitting member against leakage of fluid pressure. The sealing member is a washer or O-ring which surrounds the tube and engages the tube and at least one of the first and second threaded fitting members to establish a second seal against leakage of fluid pressure at temperatures which may relax the second fitting member and break the first seal. In a preferred embodiment the sealing member is made of silicone to maintain the second seal at the relatively high-temperatures.

20 Claims, 3 Drawing Sheets

HIGH-TEMPERATURE, DOUBLE-BEAD, TUBE-FITTING ASSEMBLY

BACKGROUND OF THE INVENTION

1. Field of the Invention

The present invention relates to tube-fitting assemblies and, more particularly, to a tube-fitting assembly having a double-bead and a sealing member so that the assembly remains sealed under relatively high temperatures.

2. Description of Related Art

Tube-fittings are known which provide a fluid tight seal and permit many disassemblies and reassemblies which effectively reseal each time. A first type of tube-fitting commonly used in the prior art is one wherein a nut is slipped over the end of the tubing and then a sleeve with two conically tapered ends is slipped over the end of the tube. The tube end is then inserted in a second coupling member which has an annular lateral shoulder at about a 45 degree angle to the tube axis. The nut also has a 45 degree angle shoulder. The two shoulders axially compress the conical sleeve to provide a seal between the sleeve and the tube.

A second type of tube-fitting assembly is a single-bead or double-bead tube-fitting. U.S. Pat. No. 4,871,199, which is expressly incorporated herein in its entirety by reference, discloses a double-bead tube-fitting. With this type of tube-fitting the conical sleeve of the first type of tube-fitting is replaced by one or more beads formed in the tube. Lateral shoulders on first and second fittings compress the beads to provide a seal between the beads and the fittings.

Each type of tube-fitting, however, may fail under relatively high temperatures. For example, gas tubing connected directly to some sealed burners of a gas stove may fail if the burner at the tube fitting connection exceeds a certain temperature. Some sealed burners may reach temperatures of up to and over 500 degrees Fahrenheit. At this temperature leaks may occur because the tube-fittings may relax. Accordingly, there is a need for a tube-fitting that remains sealed at relatively high temperatures where components of the tube-fittings may relax.

SUMMARY OF THE INVENTION

The present invention provides a tube-fitting assembly having a tube, first and second threaded fitting members, and a sealing member. The tube has at least a first annular bead near an end of the tube and a second annular bead outboard of the first annular bead. The first threaded fitting member surrounding the tube and has a radially inwardly extending first shoulder inboard of the first and second annular beads. The second threaded fitting member has an annular second shoulder at an acute angle to a longitudinal axis of the tube. The second fitting member surrounds the end of the tube and is in threaded engagement with the second threaded member such that the second shoulder engages an outboard side of the second bead to establish a first seal between the tube and the second fitting member against leakage of fluid pressure. The sealing member surrounds the tube and engages the tube and at least one of the first and second threaded fitting members to establish a second seal. The second seal provides a seal against leakage of fluid pressure at temperatures which may relax the second fitting member and break the first seal.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
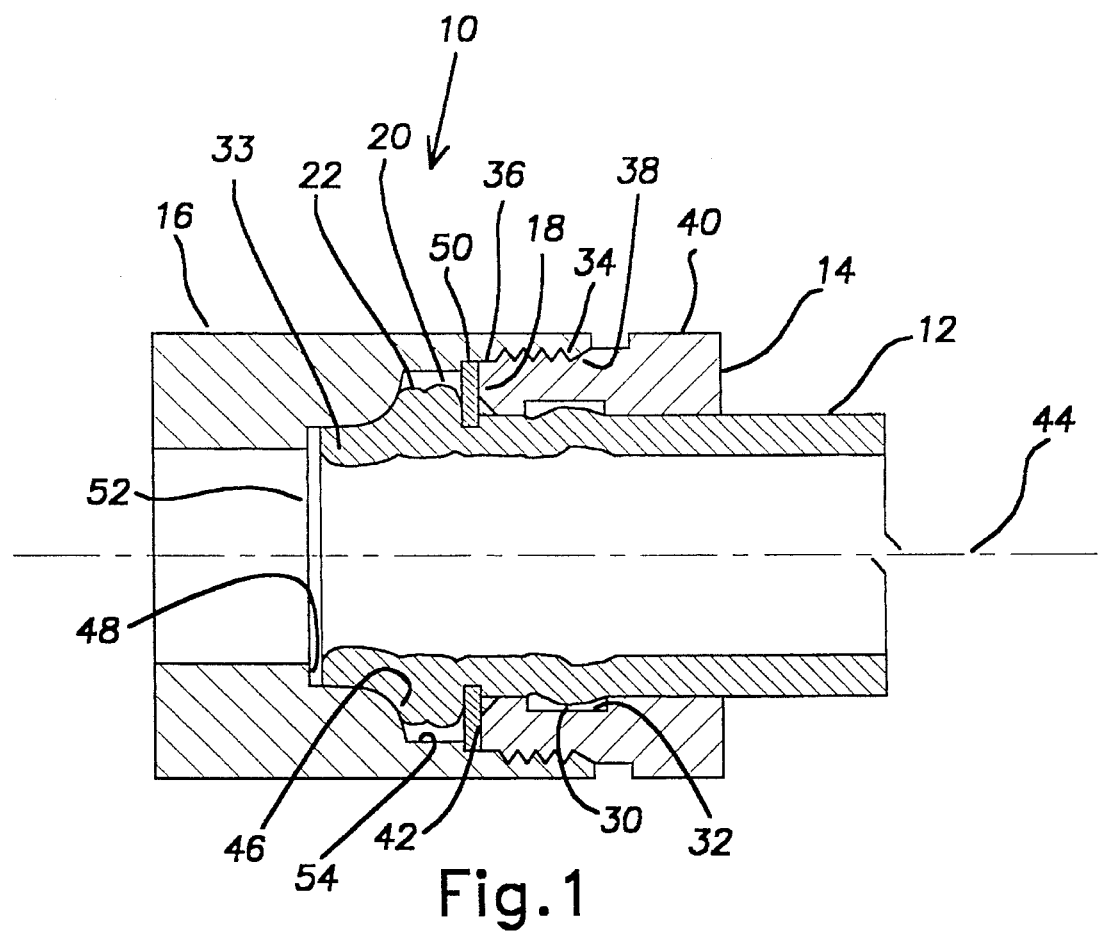
FIG. 1 is a longitudinal view, in cross-section, of a first embodiment of a high-temperature, double-bead tube-fitting assembly according to the invention.

FIG. 1 illustrates a first embodiment of a tube-fitting assembly 10 according to the invention. The tube-fitting assembly 10 includes a formed tube 12, first and second fitting members 14, 16, and at least one sealing member 18.

Figure 2:
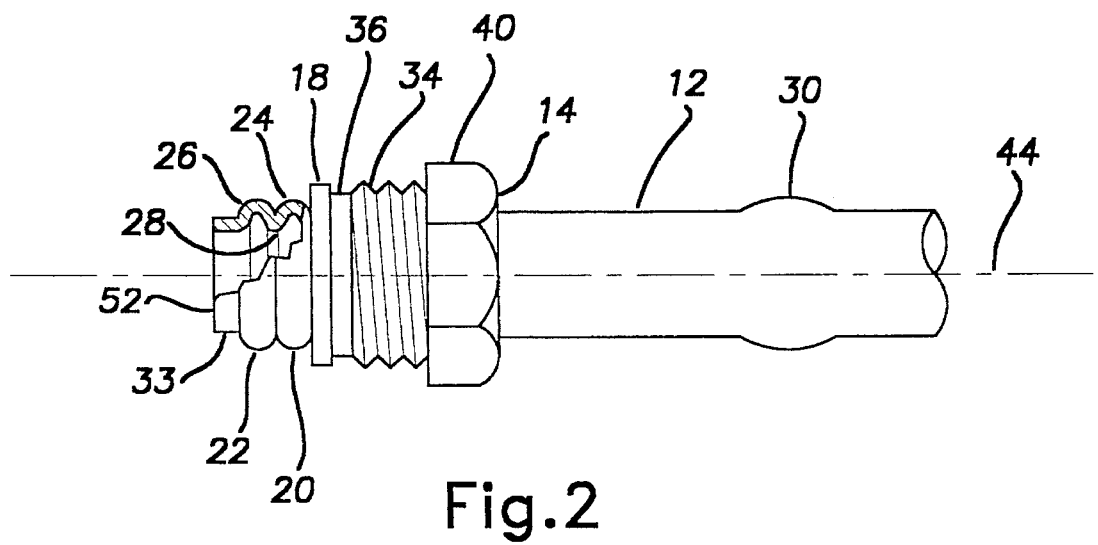
FIG. 2 is a longitudinal view, in partial cross-section, of the formed tube and male fitting member of FIG. 1 before tightening.

The tube 12, typically of aluminum, copper or steel, is formed with a plurality of beads in a known manner. While the illustrated embodiment includes first and second beads 20, 22, additional beads may be effectively utilized. The beads 20, 22 are generally annularly-shaped prior to interconnecting the fitting members as best seen in FIG. 2. The beads 20, 22 include outwardly deformed areas 24, 26 in the tube wall which are connected by an annular portion 28 having a generally U-shaped cross section. A keeper bead 30 may be provided in order to retain the first fitting member 14 in position near the end of the tube 12. The keeper bead 30 may be located inboard of the first fitting 14 (FIG. 2) or within a cavity 32 of the first fitting 14 (FIG. 1). The tube 12 is also provided with a lead-on portion 33 outboard of the second bead 22. The lead-on portion 33 is generally cylindrically-shaped to provide an axial alignment means to lead the second fitting member 16 onto the tube 12.

The first and second fitting members 14, 16 are provided with threads for interthreading engagement. As seen in FIG. 1, the first fitting member 14 is provided with male threads 34 and a lead-on portion 36. The lead-on portion 36 is provided at the entrance to the first fitting member 14 and is generally cylindrically-shaped to provide an axial alignment means to lead into female threads 38 of the second fitting member 16. This alignment means substantially aligns the fitting members 14, 16 so that a power wrench may be used to tighten the fitting members 14, 16 together without any preliminary manual threading. The fitting members 14, 16 may have any of the usual means for actuation by a tool such as, for example, a hexagonally-shaped wrench pad 40.

The first fitting member 14 is provided with a lateral shoulder 42 on the forward end thereof. The lateral shoulder 42 is typically at about a 90-degree angle relative to a central axis 44 of the tube 12. Preferably, any sharp edge is removed by providing a radius or chamfer to prevent shearing of the tube 12. The second fitting member 16 is also provided with a lateral shoulder 46 which is typically at about a 45-degree angle relative to the central axis 44 of the tube 12. The second fitting member 16 also typically has a shoulder 48 as a stop for advancement of the tube 12. The second fitting member 16 of the illustrated embodiment also has a shoulder 50 as a seat for the sealing member 18.

The sealing member 18 of the illustrated embodiment is a washer. The sealing member 18 should be made of a suitable high-temperature material such as, for example but not limited to, silicone, asbestos, ceramic with silicone, or PVC. The material must be able to withstand high temperatures in order to maintain the fluid-tight seal such as, for example but not limited to, temperatures up to 500 degrees Fahrenheit and more preferably temperatures up to 800 degrees Fahrenheit. The sealing member 18 must also be located in a position effective for sealing the fittings. The sealing member 18 preferably seals all the passages between the fitting members 14, 16 and between the fitting members 14, 16 and the tube 12. The sealing member 18 of the illustrated embodiment is located inboard of the first bead 20 of the tube 12. It is noted that the sealing member 18 could alternatively have other geometries such as, for example, the sealing member 18 could be an O-ring.

FIG. 1, shows the tube-fitting assembly 10 with the fitting members 14, 16 interthreaded to exert a longitudinal compression force on the beads 20, 22. As the first fitting member 14 is inserted into the second fitting member 16, the lead-on portion 36 helps to align the two fitting members 14, 16 to be substantially coaxial and avoid cross-threading. The interthreading of the fitting members 14, 16 causes the lateral shoulder 42 of the first fitting member 14 to compress the sealing member 18 against the first bead 20 of the tube 12 and the shoulder 50 of the second fitting member, and causes the lateral shoulder 46 of the second fitting member 16 to contact the second bead 22 of the tube 12. With the preferred construction of the lateral shoulder 42 of the first fitting member 14 being at about a 90-degree angle and the lateral shoulder 46 of the second fitting member 16 being at about a 45-degree angle, the axial compression causes all four annular portions of the beads 20, 22 to be compressed into mutual engagement. That is, each lateral portion is compressed so as to be generally continuous to the next adjacent portion or portions. Also, due to the fact that the lateral shoulder 42 of the first fitting member 14 is generally at right angles to the central axis 44, the first bead 20 is pushed axially and without much tendency to collapse radially inwardly. The lateral shoulder 46 of the second fitting member 16 being at about a 45-degree angle to the central axis 44, establishes not only an axial component on the second bead 22 but also a radially inward compressive force so that the second bead 22 is forced somewhat inwardly relative to the first bead 20.

As seen in FIG. 1, the end 52 of the tube 12 may not be pressed against the shoulder 48 of the second fitting member 16. Nevertheless, the seal which will hold fluid-tight pressure of 200 psi, for example, is established between the lateral shoulder 46 of the second fitting member 16 and the second bead 22 of the tube 12. At a relatively high temperature, however, the fitting members 14, 16 may relax to break the fluid-tight seal. The sealing member 18, however, establishes a seal which will hold fluid-tight pressure of 200 psi, for example, at the relatively high temperature because the sealing member 18 does not relax at the high temperature.

This seal is established between the sealing member 18 and the first bead 20 of the tube 12 and the shoulder 50 of the second fitting member 16.

Figure 3:
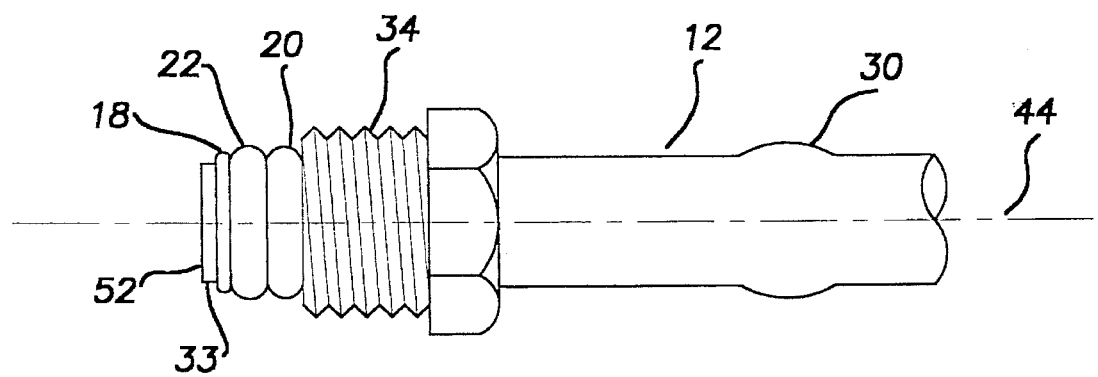
FIG. 3 is a longitudinal view of a first variation of the formed tube and the male fitting member of FIG. 1 before tightening.
Figure 4:
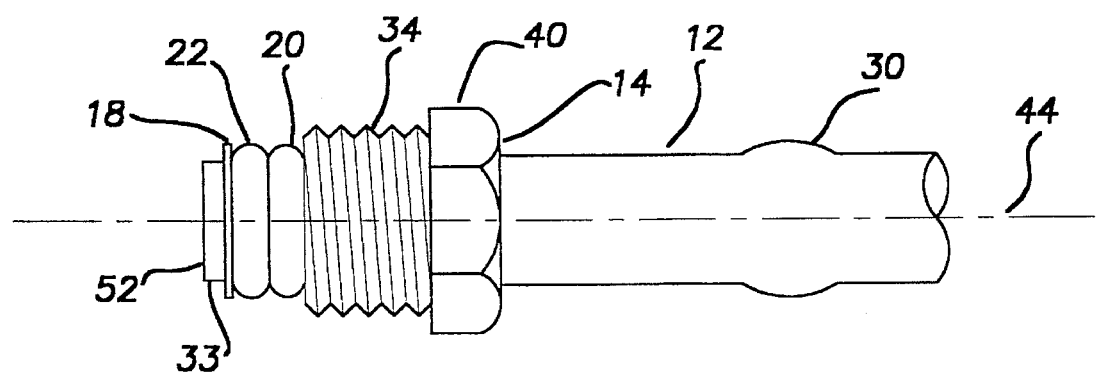
FIG. 4 is a longitudinal view of a second variation of the formed tube and the male fitting member of FIG. 1 before tightening.

FIGS. 3–7 illustrate variations of the sealing member 18 illustrated in FIGS. 1 and 2. As shown in FIGS. 3 and 4, the sealing member 18 can be located outboard of the second bead 22 of the tube 12. In this position the sealing member 18 provides a seal between the lateral shoulder 46 of the second fitting member 16 and the second bead 22 of the tube 12. The sealing member can be either an O-ring (FIG. 3) or a washer (FIG. 4).

Figure 5:
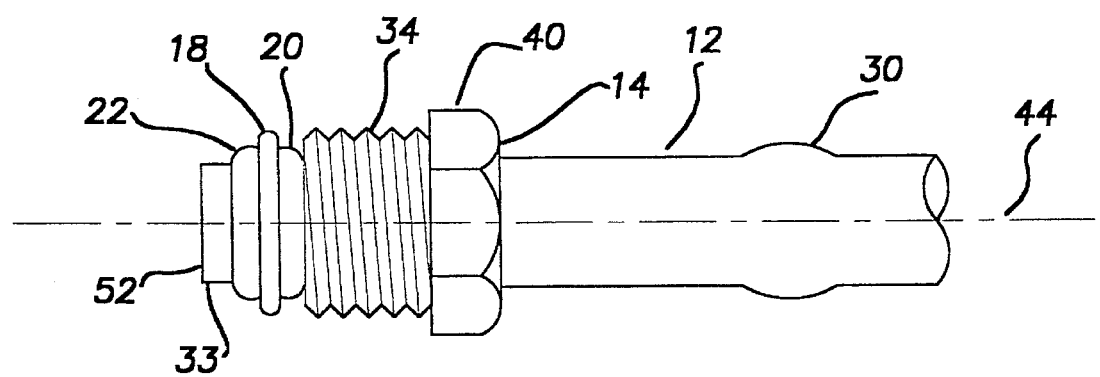
FIG. 5 is a longitudinal view of a third variation of the formed tube and the male fitting member of FIG. 1 before tightening.

As shown in FIG. 5, the sealing member can be located between the beads 20, 22 of the tube 12 in a trough formed between the beads 20, 22. In this position the sealing member 18 provides a seal between the tube 12 and an inner generally cylindrically-shaped surface 54 (FIG. 1) of the second fitting member outboard of the potential leakage paths between the first and second fitting members 14, 16 and between the first fitting member 14 and the tube 12. The sealing member 18 of the illustrated embodiment is an O-ring. It should be noted that the sealing member 18 could alternatively be a standard or bellville washer in any of the embodiments.

Figure 6:
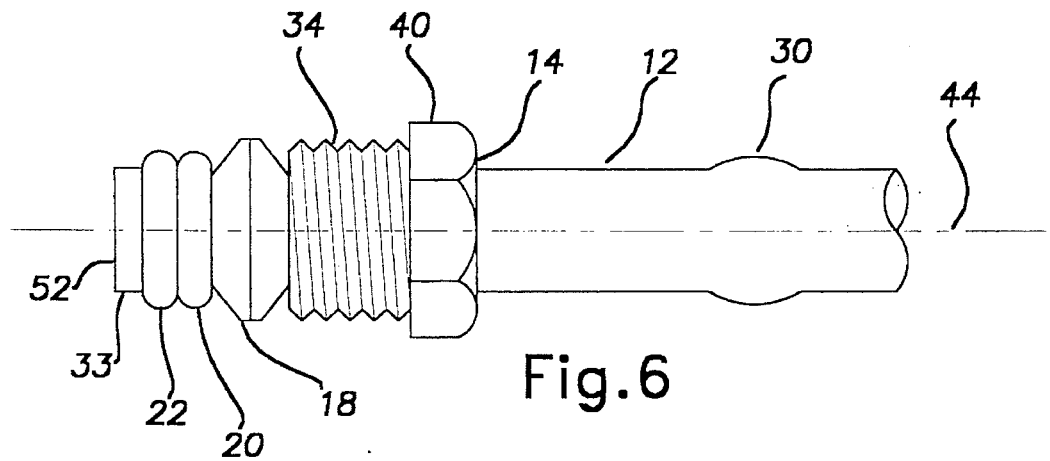
FIG. 6 is a longitudinal view of a fourth variation of the formed tube and the male fitting member of FIG. 1 before tightening.
Figure 7:
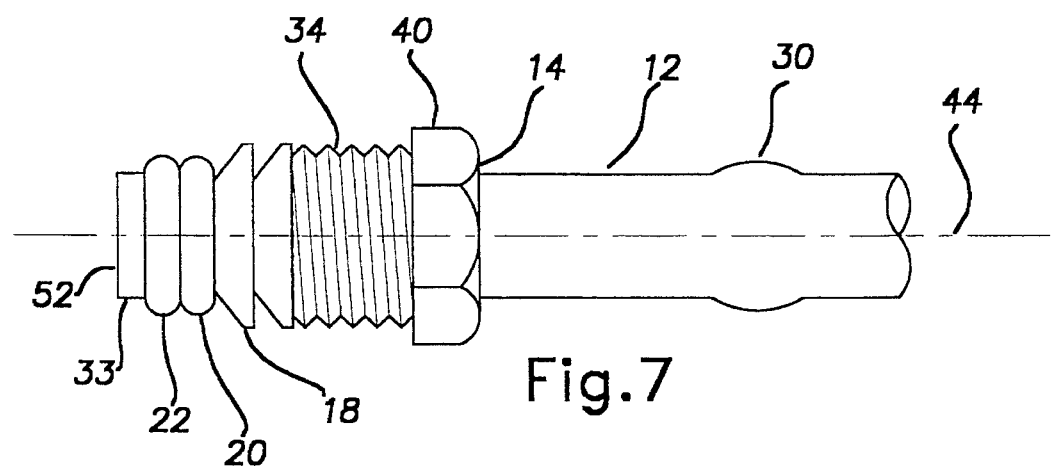
FIG. 7 is a longitudinal view of a fifth variation of the formed tube and the male fitting member of FIG. 1 before tightening.

As shown in FIGS. 6 and 7 the sealing member 18 can be a spring-type or pressure-retaining device which maintains constant pressure between the sealing surfaces at the desired operating temperatures. The pressure retaining device may be, for example but not limited to, at least one bellville washer, a coil spring, a spiral spring, a leaf spring, a helical coil or a compressible washer such as one of a material that gets smaller with compression. The illustrated embodiments include a pair of bellville washers which are shown both opposed (FIG. 6) and aligned (FIG. 7). It should be noted, however, that a single bellville washer may also provide an effective seal. The bellville washer, or other pressure-retaining device, needs to be made of a material that maintains its sealing capabilities at the needed operating temperatures. The bellville washers 18 are located between the first fitting member 14 and the first bead of the tube 20 so that a constant pressure is applied to the first fitting member 14 in an inboard direction. The pressure on the first fitting member 14 applies a pressure on the mated second fitting member 16 to maintain constant pressure between the lateral shoulder 46 of the second fitting member 16 and the second bead 22 of the tube 12 even when the components may relax due to relatively high temperatures.

It should be noted that the second fitting member 16 of the embodiments illustrated in FIGS. 3–7 does not require the shoulder 50 as a seat for the sealing member. Therefore, the second fitting member 16 may be a standard fitting member as used in the prior art.

Figure 8:
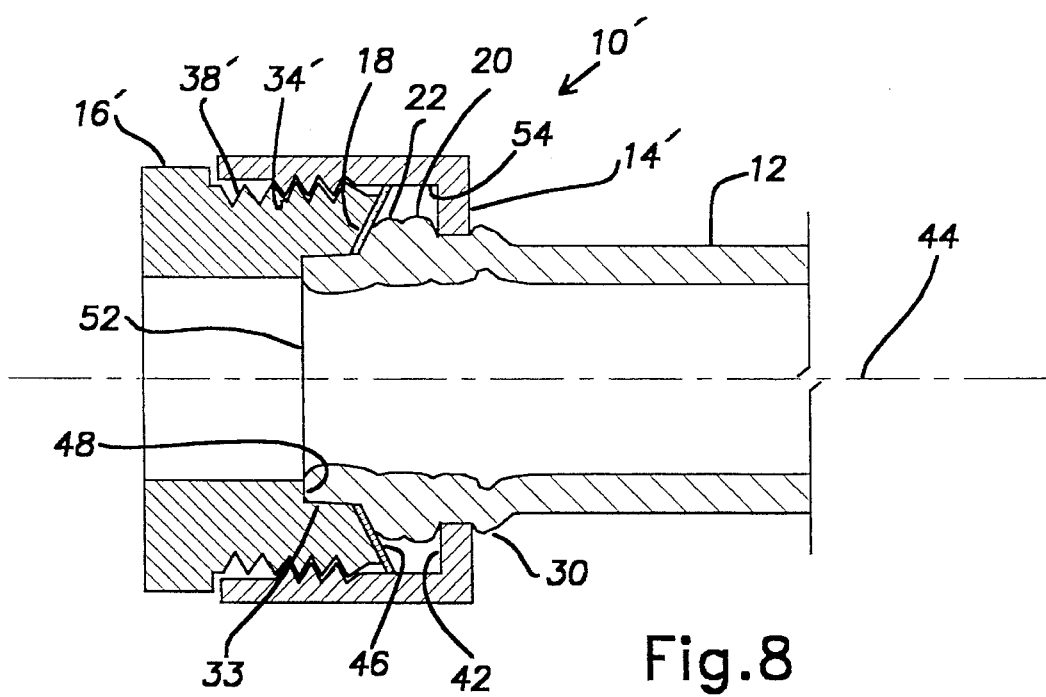
FIG. 8 is a longitudinal view, in cross-section, of a second embodiment of a high-temperature, double-bead, tube-fitting assembly according to the invention.

FIG. 8 illustrates a second embodiment of a tube-fitting assembly 10' according to the invention. The male and female threads are reversed in their position on the fitting members 14', 16'. The first fitting member 14' has female threads 34' to engage male threads 38' of the second fitting member 16'. The sealing member 18 is a washer located outboard of the second bead 22 to provide a seal between the lateral surface 46 of the second fitting member and the second bead 22 of the tube 12.

Although particular embodiments of the invention have been described in detail, it will be understood that the invention is not limited correspondingly in scope, but includes all changes and modifications coming within the spirit and terms of the claims appended hereto.

What is claimed is:

1. A tube-fitting assembly comprising:

a tube having at least one first annular bead near an end of said tube and a second annular bead contiguous with said first annular bead and located between said end and said first annular bead;

a first threaded fitting member encircling said tube and having a radially inwardly extending first shoulder, said first and second beads being located between said end and said first shoulder;

a second threaded fitting member having an annular second shoulder at an acute angle to a longitudinal axis of said tube, said second fitting member surrounding said end of said tube and being in threaded engagement with said first threaded member such that said first and second annular beads are compressed between said first shoulder and said second shoulder to establish a first seal between said tube and one of said first fitting member and said second fitting member for preventing leakage of fluid pressure; and a sealing member encircling said tube and engaging said second threaded fitting member and at least one of said first and second beads to establish a second seal for preventing leakage of fluid pressure at a temperature which breaks said first seal.

2. The tube-fitting assembly as set forth in claim 1, wherein said sealing member is formed of a material which provides a seal at temperatures of at least about 500 degrees Fahrenheit.

3. The tube-fitting assembly as set forth in claim 1, wherein said sealing member is formed of silicone.

4. The tube-fitting assembly as set forth in claim 1, wherein said sealing member is a washer.

5. The tube-fitting assembly as set forth in claim 1, wherein said sealing member is an O-ring.

6. The tube-fitting assembly as set forth in claim 1, wherein said sealing member is a pressure-retaining device.

7. The tube-fitting device as set forth in claim 6, wherein said pressure retaining device is at least one bellville washer.

8. The tube-fitting assembly as set forth in claim 1, wherein said sealing member is located between said first bead and said first shoulder of said first threaded fitting member and is compressed between said first shoulder and said first bead and between said first shoulder and a third lateral annular shoulder located on said second threaded fitting member to establish said second seal.

9. The tube-fitting assembly as set forth in claim 1, wherein said sealing member is located between said second bead and said second shoulder of said second threaded fitting member and is compressed between said second shoulder and said second bead.

10. The tube-fitting assembly as set forth in claim 1, wherein said sealing member is longitudinally located generally between said first bead and said second bead and is compressed between each of said first and second beads and an inner surface of said second threaded fitting member, said inner surface being generally parallel with the longitudinal axis of said tube.

11. A tube-fitting assembly for use with a cooperating threaded fitting having a lateral annular shoulder, said tube-fitting assembly comprising:

a tube having a first annular bead near an end of said tube and a second annular bead located adjacent said first annular bead and between said end and said first annular bead;

a threaded fitting member encircling said tube and having a lateral annular shoulder, said first and second beads being located between said end and said shoulder of said threaded fitting member, said first threaded fitting member adapted to threadably coact with the cooperating threaded fitting, with said end of said tube received within the cooperating threaded fitting such that said first and second annular beads are compressed between said shoulder of said threaded fitting member and the shoulder of the cooperating threaded fitting to establish a first seal between said tube and one of said shoulder of the threaded fitting member and the shoulder of the cooperating threaded fitting for preventing leakage of fluid pressure; and a sealing member encircling said tube and located to engage the cooperating fitting and at least one of said first and second beads and establish a second seal when the cooperating fitting is in threaded engagement with said threaded fitting member for preventing leakage of fluid pressure at a temperature which breaks the first seal.

12. The tube-fitting assembly as set forth in claim 11, wherein said sealing member is formed of a material which provides a seal at temperatures of at least about 500 degrees Fahrenheit.

13. The tube-fitting assembly as set forth in claim 11, wherein said sealing member is formed of silicone.

14. The tube-fitting assembly as set forth in claim 11, wherein said sealing member is a washer.

15. The tube-fitting assembly as set forth in claim 11, wherein said sealing member is an O-ring.

16. The tube-fitting assembly as set forth in claim 11, wherein said sealing member is a pressure-retaining device.

17. The tube-fitting assembly as set forth in claim 16, wherein said pressure-retaining device is at least one bellville washer.

18. The tube-fitting assembly as set forth in claim 11, wherein said sealing member is located between said first bead and said shoulder of said threaded fitting member and is compressed between said shoulder of said threaded fitting member and said first bead and between said shoulder of said threaded fitting member and the cooperating threaded fitting when said threaded fitting member is in threaded engagement with the cooperating threaded fitting member.

19. The tube-fitting assembly as set forth in claim 11, wherein said sealing member is located between said end and said second bead and is compressed between the shoulder of said cooperating threaded fitting and said second bead when said threaded fitting member is in threaded engagement with the cooperating threaded fitting.

20. The tube-fitting assembly as set forth in claim 11, wherein said sealing member is longitudinally located generally between said first bead and said second bead and is compressed between each of said first and second beads and the cooperating threaded fitting when said threaded fitting member is in threaded engagement with the cooperating threaded fitting.

* * * * *